United States Patent
Wang

(10) Patent No.: US 10,302,206 B2
(45) Date of Patent: May 28, 2019

(54) CONTROL HANDLE ASSEMBLY FOR A FLUID VALVE STRUCTURE

(71) Applicant: Y.S. VALVE MANUFACTURING CO., LTD., Chang Hua (TW)

(72) Inventor: Chi-Yuan Wang, Changhua County (TW)

(73) Assignee: Y.S. VALVE MANUFACTURING CO., LTD., Chang Hua (TW)

( * ) Notice: Subject to any disclaimer, the term of this patent is extended or adjusted under 35 U.S.C. 154(b) by 65 days.

(21) Appl. No.: 14/800,939

(22) Filed: Jul. 16, 2015

(65) Prior Publication Data

US 2017/0016545 A1    Jan. 19, 2017

(51) Int. Cl.
| | | |
|---|---|---|
| *F16K 27/06* | (2006.01) | |
| *F16K 11/087* | (2006.01) | |
| *F16K 37/00* | (2006.01) | |
| *F16K 31/60* | (2006.01) | |
| *F16K 35/04* | (2006.01) | |

(52) U.S. Cl.
CPC ........ *F16K 11/0873* (2013.01); *F16K 27/067* (2013.01); *F16K 31/602* (2013.01); *F16K 35/04* (2013.01); *F16K 37/0008* (2013.01); *F16K 37/0058* (2013.01)

(58) Field of Classification Search
CPC ...... F16K 5/0605; F16K 5/10; F16K 37/0008; F16K 31/602
USPC ..... 137/553, 556; 251/89, 208, 297, 315.01, 251/315.07
See application file for complete search history.

(56) References Cited

U.S. PATENT DOCUMENTS

| | | | | |
|---|---|---|---|---|
| 932,188 | A * | 8/1909 | Strelezky | F16K 31/602 251/99 |
| 952,743 | A * | 3/1910 | Jenkins | F16K 31/602 251/99 |
| 1,131,224 | A * | 3/1915 | Ellwood | F16K 31/602 251/99 |
| 1,333,048 | A * | 3/1920 | Webster | A62C 31/005 137/625.32 |
| 3,170,483 | A * | 2/1965 | Milroy | F16K 3/029 137/553 |
| 4,852,610 | A * | 8/1989 | McHugh | A62C 37/50 137/271 |
| 4,971,109 | A * | 11/1990 | McHugh | A62C 35/68 137/559 |

(Continued)

*Primary Examiner* — Angelisa L. Hicks
(74) *Attorney, Agent, or Firm* — Jackson IPG PLLC; Demian K. Jackson

(57) ABSTRACT

A fluid valve structure capable of outputting constant flow and constant pressure is provided. A control handle is adapted to control turning of a ball valve. The ball valve is formed with first, second and third openings. The openings are arranged at 90 degrees each other. The diameters of the first, second and third openings can be set according to the required flow and pressure. The fluid passes the first, second and third openings through an annular guide groove and guide holes of a water inflow connector, enabling the fluid gathered to the small diameter pipe portion to output constant flow and constant pressure. The user can observe the state of the fluid through glass windows provided on the small diameter pipe portion. The control handle controls the turning of the ball valve for the openings to be located in TEST, OFF, and DRAIN state, respectively.

1 Claim, 11 Drawing Sheets

(56) References Cited

U.S. PATENT DOCUMENTS

| | | | | |
|---|---|---|---|---|
| 5,944,051 A | * | 8/1999 | Johnson | A62C 37/50 |
| | | | | 137/559 |
| 6,899,128 B2 | * | 5/2005 | Oh | F16K 5/0605 |
| | | | | 137/385 |
| 2008/0067462 A1 | * | 3/2008 | Miller | A61M 39/22 |
| | | | | 251/149.1 |
| 2012/0161053 A1 | * | 6/2012 | Wang | F16K 5/0605 |
| | | | | 251/315.01 |

* cited by examiner

CONTROL HANDLE ASSEMBLY FOR A FLUID VALVE STRUCTURE

BACKGROUND OF THE INVENTION

1. Field of the Invention

The present invention relates to a fluid valve structure, and more particularly to a fluid valve structure able to output constant flow and constant pressure conveniently.

2. Description of the Prior Art

For adjustment of flow and pressure, a conventional fluid valve generally controls the output of the flow and pressure by turning a ball valve for the opening of the ball valve to be covered. It is difficult to adjust the required flow precisely. The operator has to do fine adjustments many times. Accordingly, the inventor of the present invention has devoted himself based on his many years of practical experiences to solve these problems.

SUMMARY OF THE INVENTION

The primary object of the present invention is to provide a fluid valve structure capable of outputting constant flow and constant pressure. By the engagement of a first indication member and a first indication notch, the engagement of a second indication member and a second indication notch, and the engagement of a second holding hole of a holding section of a control handle and an exposed portion of a rolling ball, the fluid valve structure of the present invention can precisely control the turning of a ball valve to be located in TEST, OFF, DRAIN states, respectively. The present invention can be operated conveniently and disassembled with ease.

In order to achieve the object, the fluid valve structure capable of outputting constant flow and constant pressure of the present invention comprises a connector main body, a first visual pipe, a second visual pipe, a positioning assembly, a water inflow connector, a ball valve assembly, a transmission rod, and a control handle.

The connector main body includes a large diameter pipe portion and a small diameter pipe portion. The large diameter pipe portion is in communication with the small diameter pipe portion. One end of the large diameter pipe portion, opposite to the small diameter pipe portion, is formed with inner threads. The large diameter pipe portion includes a connecting pipe extending upward. The connecting pipe is formed with a first indication member extending in a first radial direction of the large diameter pipe portion, a second indication member extending in a second radial direction of the large diameter pipe portion, and a third indication member extending in an axial direction of the large diameter pipe portion and facing toward the small diameter pipe portion. The second radial direction is opposite to the first radial direction.

The first visual pipe extends from the small diameter pipe portion in the first radial direction and communicates with the small diameter pipe portion. A first visual pipe is screwedly provided with a first visual lens assembly therein.

The second visual pipe extends from the small diameter pipe portion in the second radial direction and communicates with the small diameter pipe portion. The second visual pipe is screwedly provided with a second visual lens assembly therein.

The positioning assembly includes an outer threaded pipe, a rolling ball, and an elastic member. The elastic member is inserted in the third indication member. A first end of the elastic member is pressed against the inside of the third indication member. The rolling ball is disposed inside the third indication member to lean against a second end of the elastic member, opposite to the first end of the elastic member. The outer threaded pipe is screwed inside the third indication member. The rolling ball and the elastic member are located inside the outer threaded pipe. One end of the outer threaded pipe, away from the third indication member, is formed with an inner flange. The inner flange is adapted to hold against the rolling ball, such that the rolling ball is retained to be turned and a portion of the rolling ball is exposed.

The water inflow connector has an outer threaded section, an inner shoulder portion, an outer raised ring, and a connecting section. Two ends of the outer raised ring are communicated with the outer threaded section and the connecting section, respectively. The inner shoulder portion is disposed inside the outer threaded section or extends from an inner circumferential edge of the outer raised ring. An annular guide groove is formed between the inner shoulder portion and the outer raised ring. The outer threaded section of the water inflow connector is screwed to the inner threads of the large diameter pipe portion. The outer threaded section is axially formed with guide holes. The guide holes are communication with the annular guide groove. The outer raised ring leans against one end of the large diameter pipe portion, opposite to the small diameter pipe portion.

The ball valve assembly includes a first ball gasket, a second ball gasket, and a ball valve. The first ball gasket is disposed in the large diameter pipe portion and positioned at the junction of the large diameter pipe portion and the small diameter pipe portion. The second ball gasket is disposed in the outer threaded section of the water inflow connector and positioned in the inner shoulder portion. The ball valve is rotatably disposed in the large diameter pipe portion and sandwiched between the first ball gasket and the second ball gasket. The ball valve has a main body, an engaging slot, a first opening, a second opening, and a third opening. The engaging slot is disposed atop the main body and located under the connecting pipe. The axial direction of the engaging slot is parallel to the axial direction of the large diameter pipe portion of the connector main body. The first opening is formed on the main body in the first radial direction. The second opening is formed on the main body in the second radial direction. The third opening is formed on the main body in the direction of the second ball gasket. The diameters of the first opening, the second opening, and the third opening can be set according to the demand of the user for the fluid gathered to the small diameter pipe portion through the openings of different diameters to achieve the preset value of constant flow and constant pressure.

The transmission rod has a drive section and an engaging section connected with the drive section. The drive section is pivotally inserted into the connecting pipe and engaged with the engaging slot of the ball valve. The engaging section is exposed out of the connecting pipe.

The control handle includes a handle section and a holding section. The holding section extends downward from a front end of the handle section. One end of the holding section, close to the handle section, is formed with a first indication notch in the first axial direction and a second indication notch in the second axial direction. One end of the handle section, close to the holding section, is formed with a first holding hole. The engaging section of the transmission rod is inserted through the first holding hole and locked by a fixing nut. The holding section of the control handle is secured on the transmission rod, enabling the control handle to bring the transmission rod to turn. The holding section is formed with a second holding hole for the exposed portion of the rolling ball to be movably engaged in the second holding hole.

Preferably, the drive section of the transmission rod corresponds in shape to the engaging slot of the ball valve.

Preferably, the first indication member is marked DRAIN, the second indication member is marked OFF, and the third indication member is marked TEST.

Preferably, the diameter of the second opening is preset according to the required specification for the fluid from the large diameter pipe portion to the small diameter pipe portion to output constant flow and constant pressure.

DETAILED DESCRIPTION OF THE PREFERRED EMBODIMENTS

Figure 1:
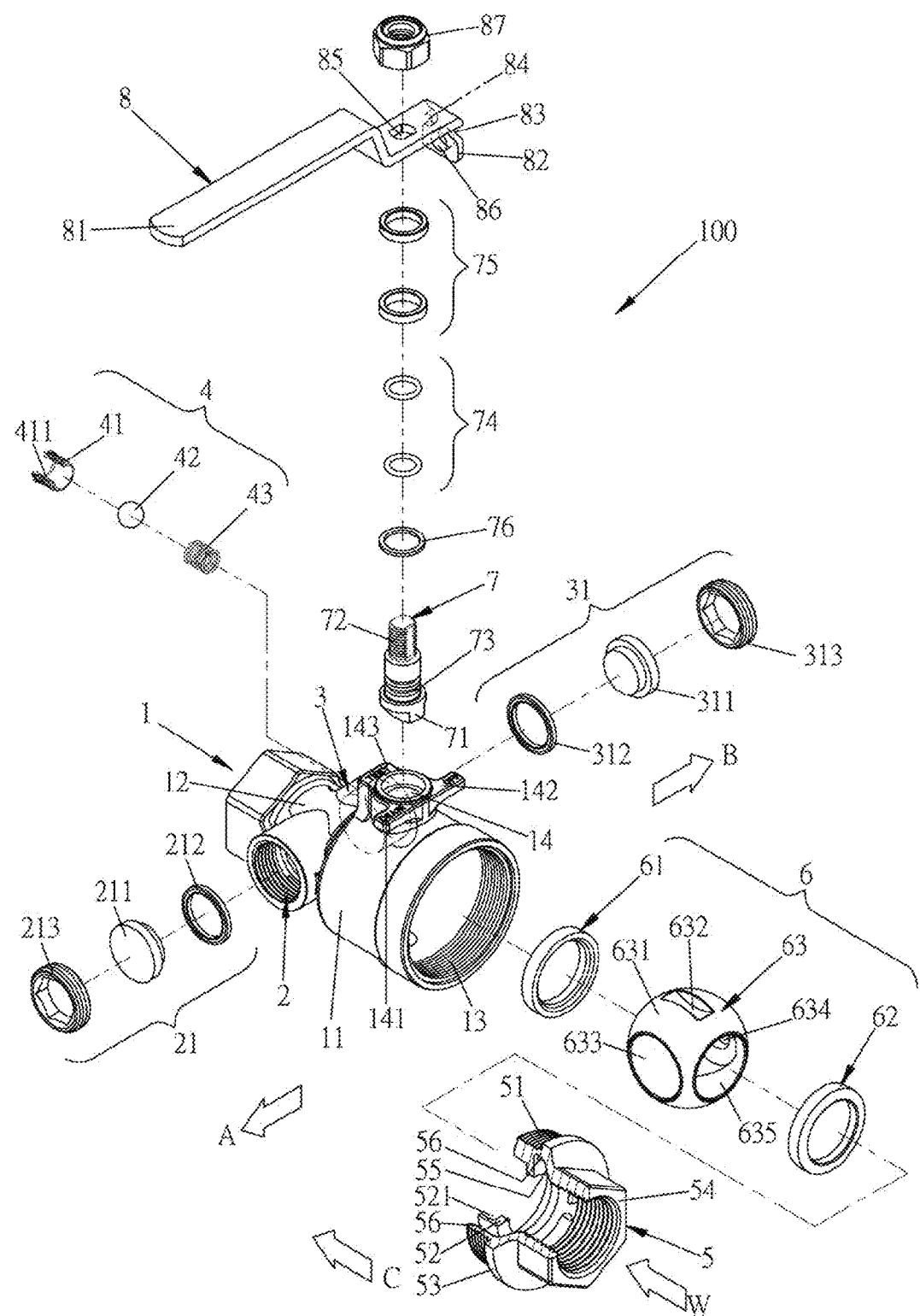
FIG. 1 is an exploded view according to a preferred embodiment of the present invention.

Embodiments of the present invention will now be described, by way of example only, with reference to the accompanying drawings.

As shown in FIG. 1 through FIG. 11, the present invention discloses a fluid valve structure 100 able to control discharge. The fluid valve structure 100 comprises a connector main body 1, a first visual pipe 2, a second visual pipe 3, a positioning assembly 4, a water inflow connector 5, a ball valve assembly 6, a transmission rod 7, and a control handle 8.

Figure 3:
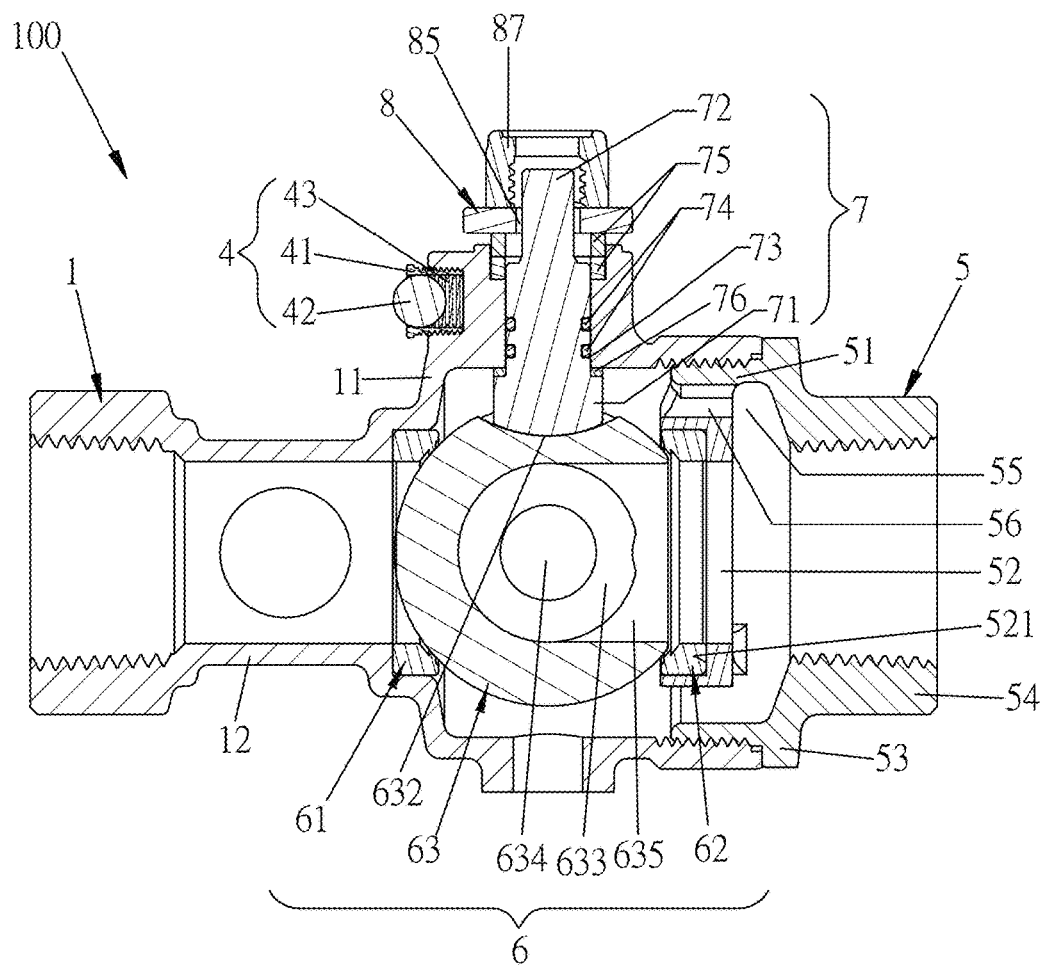
FIG. 3 is a sectional view according to the preferred embodiment of the present invention.
Figure 4:
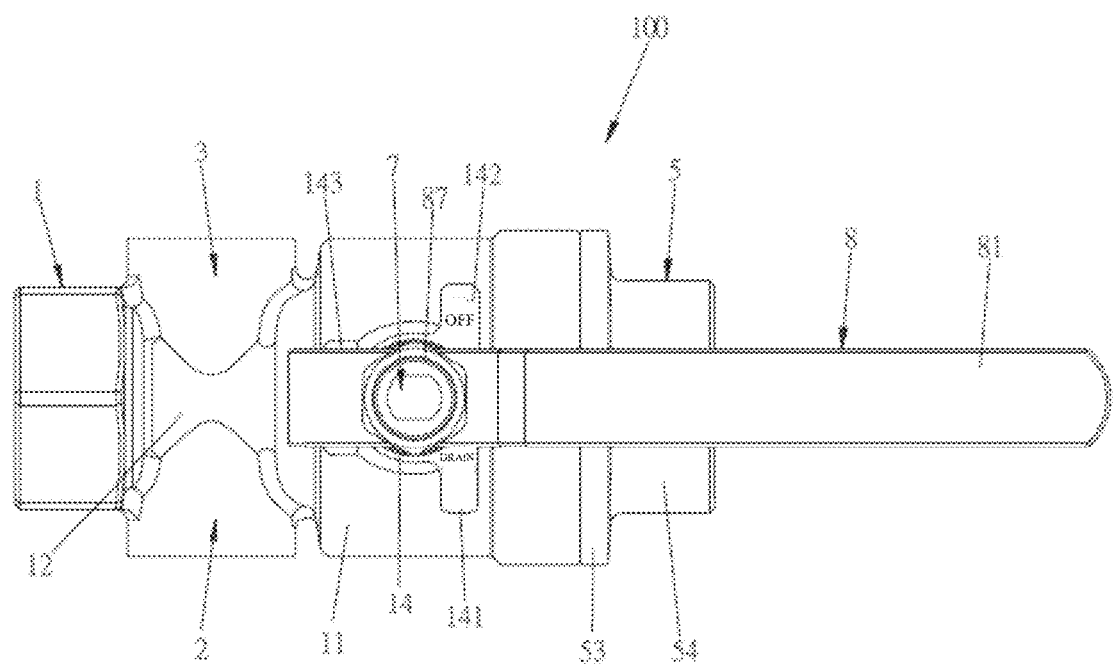
FIG. 4 is a top view according to the preferred embodiment of the present invention.
Figure 5:
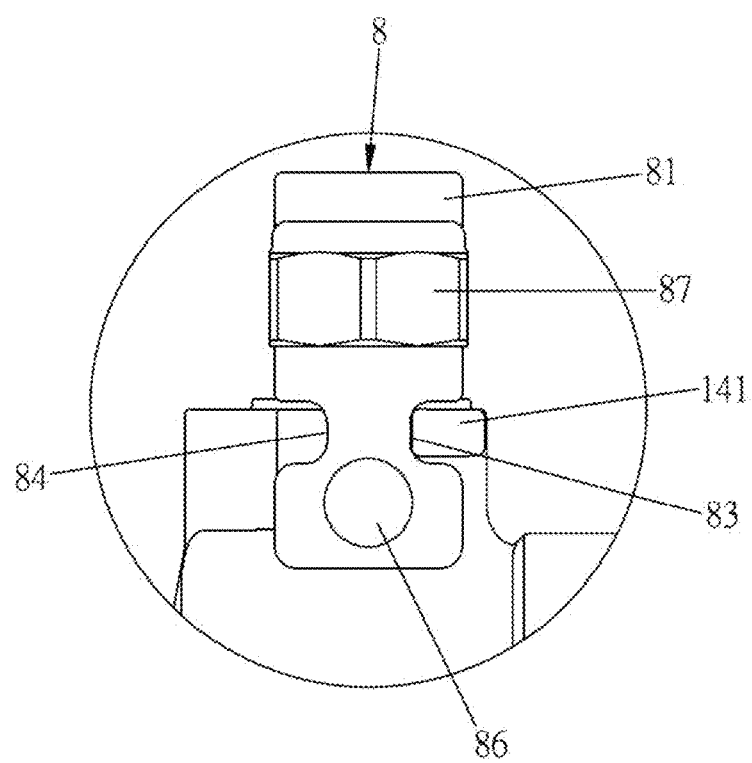
FIG. 5 is a partial enlarged view according to the preferred embodiment of the present invention.

The connector main body 1 includes a large diameter pipe portion 11 and a small diameter pipe portion 12. The large diameter pipe portion 11 is in communication with the small diameter pipe portion 12. One end of the large diameter pipe portion 11, opposite to the small diameter pipe portion 12, is formed with inner threads 13. The large diameter pipe portion 11 includes a connecting pipe 14 extending upward. The large diameter pipe portion 11 has a first inner trough 111 located in front of the small diameter pipe portion 12 for a first ball gasket 61 to be inserted and positioned therein. The first ball gasket 61 is adapted to hold against a ball valve 63, as shown in FIG. 3. The connecting pipe 14 is formed with a first indication member 141 extending in a first radial direction A of the large diameter pipe portion 11, a second indication member 142 extending in a second radial direction B of the large diameter pipe portion 11, and a third indication member 143 extending in an axial direction C of the large diameter pipe portion 11 and facing toward the small diameter pipe portion 12. The second radial direction B is opposite to the first radial direction A. The first, second and third indication members 141, 142, 143 correspond to openings 633, 634, 635 of the ball valve 63, respectively. The diameters of the openings 633, 634, 635 can be set according to the demand of the user for fluid W to flow into the small diameter pipe portion 12 through the openings 633, 634 635 of different diameters so as to achieve the preset value of constant flow and constant pressure. The operation is convenient, without complicated procedures to control and fine adjust flow.

The first indication member 141 is marked "DRAIN". The second indication member 142 is marked "OFF". The third indication member 143 is marked "TEST".

The first visual pipe 2 extends from the small diameter pipe portion 12 in the first radial direction A and communicates with the small diameter pipe portion 12. The first visual pipe 2 is screwedly provided with a first visual lens assembly 21 therein. The second visual pipe 3 extends from the small diameter pipe portion 12 in the second radial direction B and communicates with the small diameter pipe portion 12. The second visual pipe 3 is screwedly provided with a second visual lens assembly 31 therein. The first visual lens assembly 21 and the second visual lens assembly 31 comprise glass windows 211, 311, hollow tightening members 213, 313, and water stop ring 212, 312. The hollow tightening members 213, 313 are adapted to press the glass windows 211, 311 to lean against the water stop ring 212, 312 so as to be located in the first and second visual pipes 2, 3, respectively. The user can observe the interior of the small diameter pipe portion 12 through the glass windows 211, 311 so as to know the state of the fluid W passing through the small diameter pipe portion 12.

The positioning assembly 4 includes an outer threaded pipe 41, a rolling ball 42, and an elastic member 43. The elastic member 43 is a compression spring inserted in the third indication member 143. A first end of the elastic member 43 is pressed against the inside of the third indication member 143. The rolling ball 42 is disposed inside the third indication member 143 to lean against a second end of the elastic member 43, opposite to the first end of the elastic member 43. The outer threaded pipe 41 is screwed inside the third indication member 143. The rolling ball 42 and the elastic member 43 are located inside the outer threaded pipe 41. One end of the outer threaded pipe 41, away from the third indication member 143, is formed with an inner flange 411. The inner flange 411 is adapted to hold against the rolling ball 42, such that the rolling ball 42 is retained to be turned and a portion of the rolling ball 42 is exposed.

The water inflow connector 5 has an outer threaded section 51, an inner shoulder portion 52, an outer raised ring 53, and a connecting section 54. Two ends of the outer raised ring 53 are communicated with the outer threaded section 51 and the connecting section 54, respectively. The inner shoulder portion 52 can be disposed inside the outer threaded section 51 or extend from an inner circumferential edge of the outer raised ring 53. An annular guide groove 55 is formed between the inner shoulder portion 52 and the outer raised ring 53. An end face of the inner shoulder portion 52 is provided with a plurality of guide holes 56 communicating with the annular guide groove 55. A second inner trough 521 is formed in the inner shoulder portion 52 for a second ball gasket 62 to be inserted and positioned therein. The second ball gasket 62 is adapted to hold against the ball valve 63. When the outer threaded section 51 of the water inflow connector 5 is screwed to the inner threads 13 of the large diameter pipe portion 11, the outer threaded section 51 is axially formed with the plurality of guide holes 56. Each guide hole 56 is communication with the annular guide groove 55. When the outer raised ring 53 leans against the end edge of the large diameter pipe portion 11, the ball valve 6 is held between the first ball gasket 61 in the large diameter pipe portion 11 and the second ball gasket 62 in the water inflow connector 5.

The ball valve assembly 6 includes a first ball gasket 61, a second ball gasket 62, and a ball valve 63. The first ball gasket 61 is disposed in the large diameter pipe portion 11 and positioned in the first inner trough 111 at the junction of the large diameter pipe portion 11 and the small diameter pipe portion 12. The second ball gasket 62 is disposed in the outer threaded section 51 of the water inflow connector 5 and positioned in the second inner trough 521 of the inner shoulder portion 52. The ball valve 63 is rotatably disposed in the large diameter pipe portion 11 and sandwiched between the first ball gasket 61 and the second ball gasket 62. The ball valve 63 has a main body 631, an engaging slot 632, a first opening 633, a second opening 634, and a third opening 635. The engaging slot 632 is disposed atop the main body 631 and located under the connecting pipe 14. The axial direction of the engaging slot 632 is parallel to the axial direction of the large diameter pipe portion 11 of the connector main body 1. The first opening 633 is formed on the main body 631 in the first radial direction A. The second opening 634 is formed on the main body 631 in the second radial direction B. The third opening 633 is formed on the main body 631 in the direction of the second ball gasket 62. The first opening 633, the second opening 634, and the third opening 635 may have different diameters according to the demand of the user so as to achieve constant flow and constant pressure for the inflow of the small diameter pipe portion 12.

Figure 2:
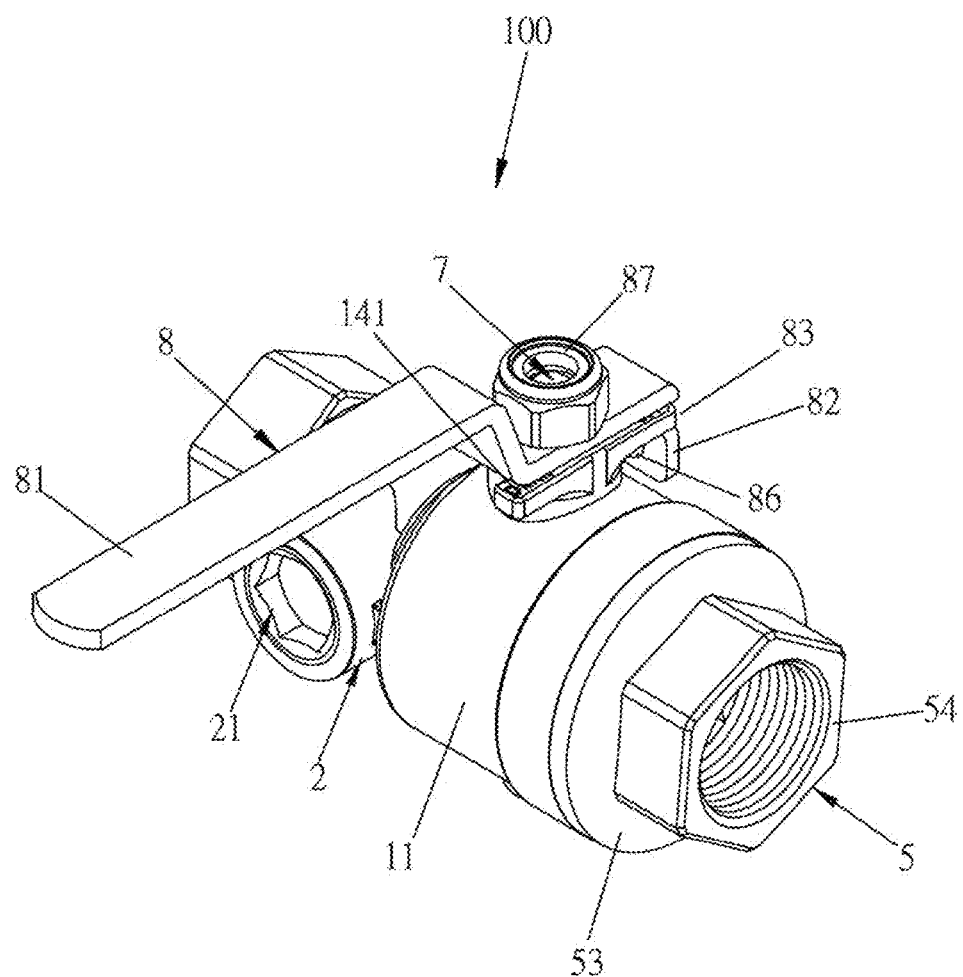
FIG. 2 is a perspective view according to the preferred embodiment of the present invention.

The transmission rod 7 has a drive section 71 and an engaging section 72 connected with the drive section 71. The drive section 71 is inserted into the connecting pipe 14 and engaged with the engaging slot 632 of the ball valve 63. The drive section 71 is in a slotted shape, but not limited to. The engaging section 72 is exposed out of the connecting pipe 14. A washer 76 is fitted on the transmission rod 7 above the drive section 71. The transmission rod 7 is formed with a plurality of annular grooves 73 above the washer 76. The annular grooves 73 are provided with O-shaped rings 74 corresponding in number to the annular grooves 73. The transmission rod 7 is further fitted with a plurality of water stop gaskets 75. In this way, there is no water leakage between the transmission rod 7 and the connecting pipe 14, as shown in FIG. 1 and FIG. 2.

The control handle 8 includes a handle section 81 and a holding section 82. The holding section 81 extends downward from a front end of the handle section 81. One end of the holding section 82, close to the handle section 81, is formed with a first indication notch 83 in the first axial direction A and a second indication notch 84 in the second axial direction B. One end of the handle section 81, close to the holding section 82, is formed with a first holding hole 85. The engaging section 72 of the transmission rod 7 is inserted through the first holding hole 85 and locked by a fixing nut 87, such that the holding section 82 of the control handle 8 is secured on the transmission rod 7, enabling the control handle 8 to bring the transmission rod 7 to turn. The holding section 82 is formed with a second holding hole 86 for receiving the exposed portion of the rolling ball 42.

Figure 6:
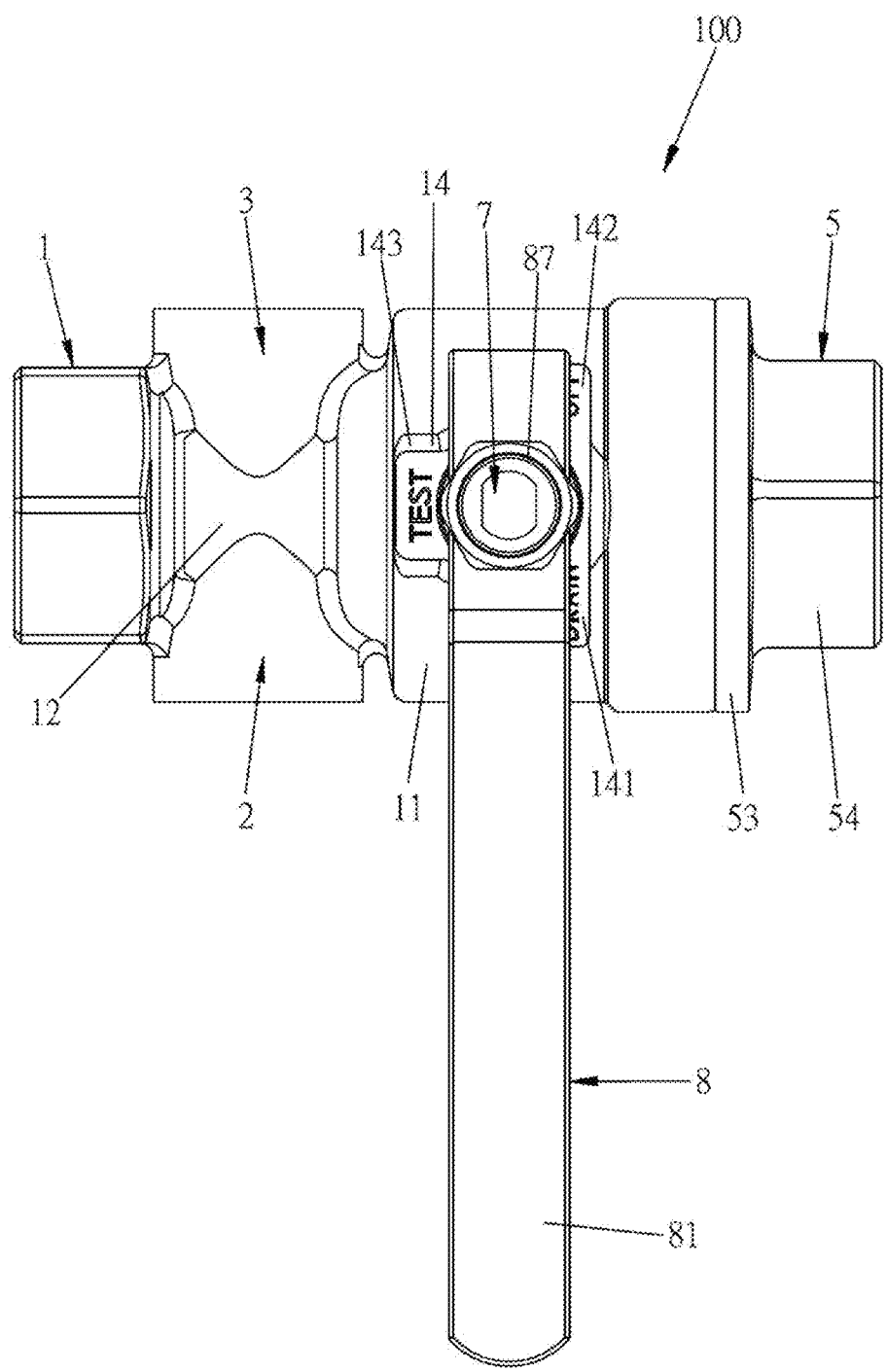
FIG. 6 is a top view according to the preferred embodiment of the present invention in OFF state.
Figure 7:
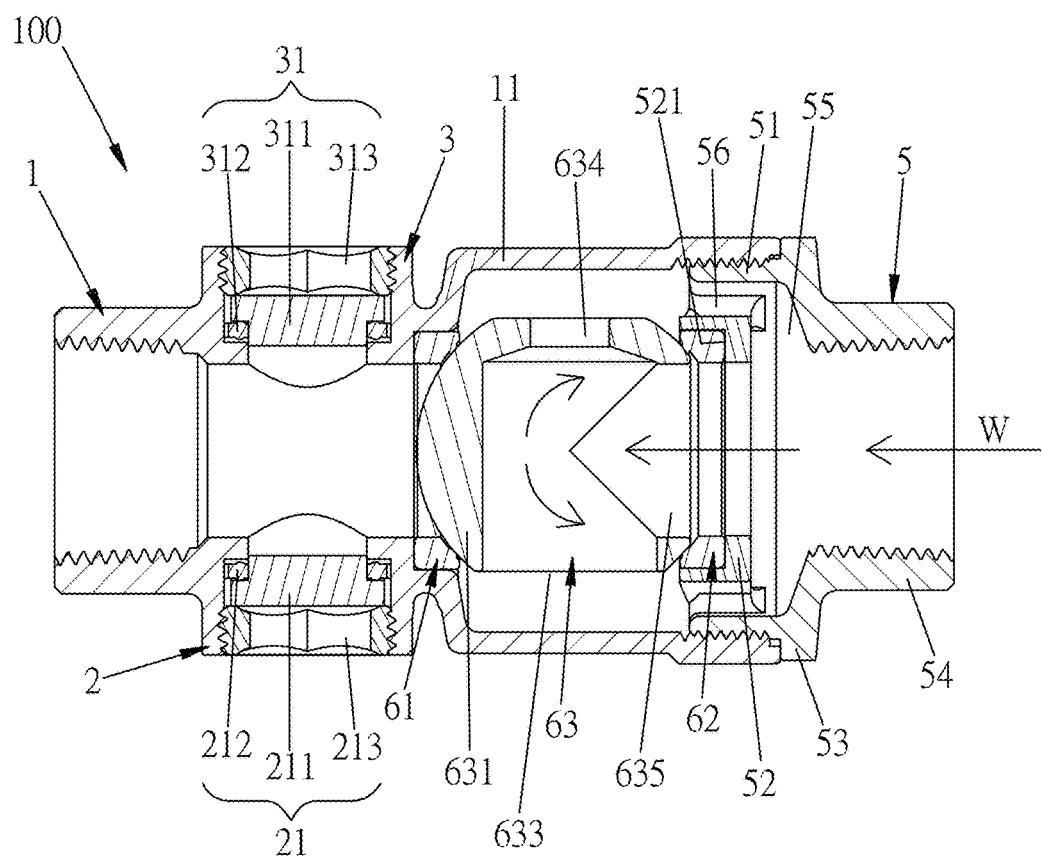
FIG. 7 is a sectional view according to the preferred embodiment of the present invention in OFF state.

Referring to FIG. 6 and FIG. 7, when the handle section 81 of the control handle 8 is turned in the first axial direction A, the second holding hole 86 of the holding section 82 is moved away from the exposed portion of the rolling ball 42 and the second indication notch 84 is aligned with the mark "OFF" of the second indication member 142. The first holding hole 85 of the handle section 81 of the control handle 8 is adapted to control the engaging section 72 of the transmission rod 7 to pivot. The drive section 71 of the transmission rod 7 is engaged with the engaging slot 632 of the ball valve 63, such that the ball valve 63 can be turned. At this time, the third opening 635 of the ball valve 63 faces the water inflow connector 5, and one side of the main body 631 of the ball valve 63, opposite to the third opening 635, is to block the annular guide groove 55 and the guide holes 56 so as to block the fluid W. This is in OFF state.

Figure 8:
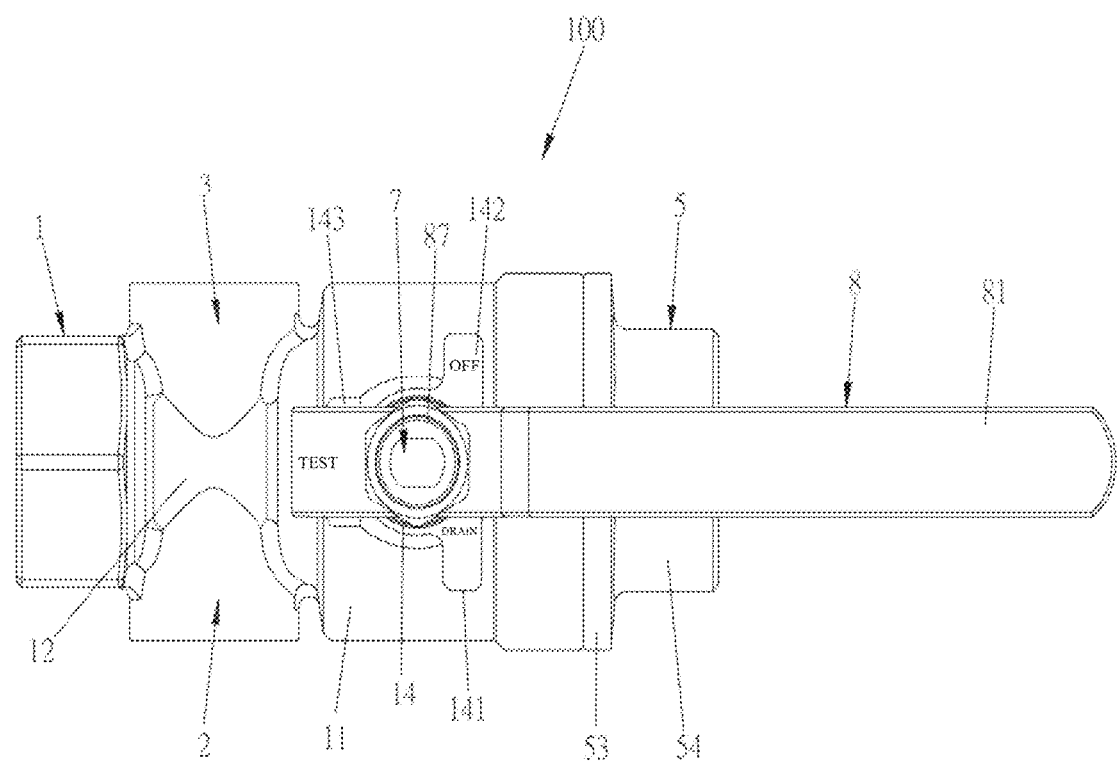
FIG. 8 is a top view according to the preferred embodiment of the present invention in TEST state.
Figure 9:
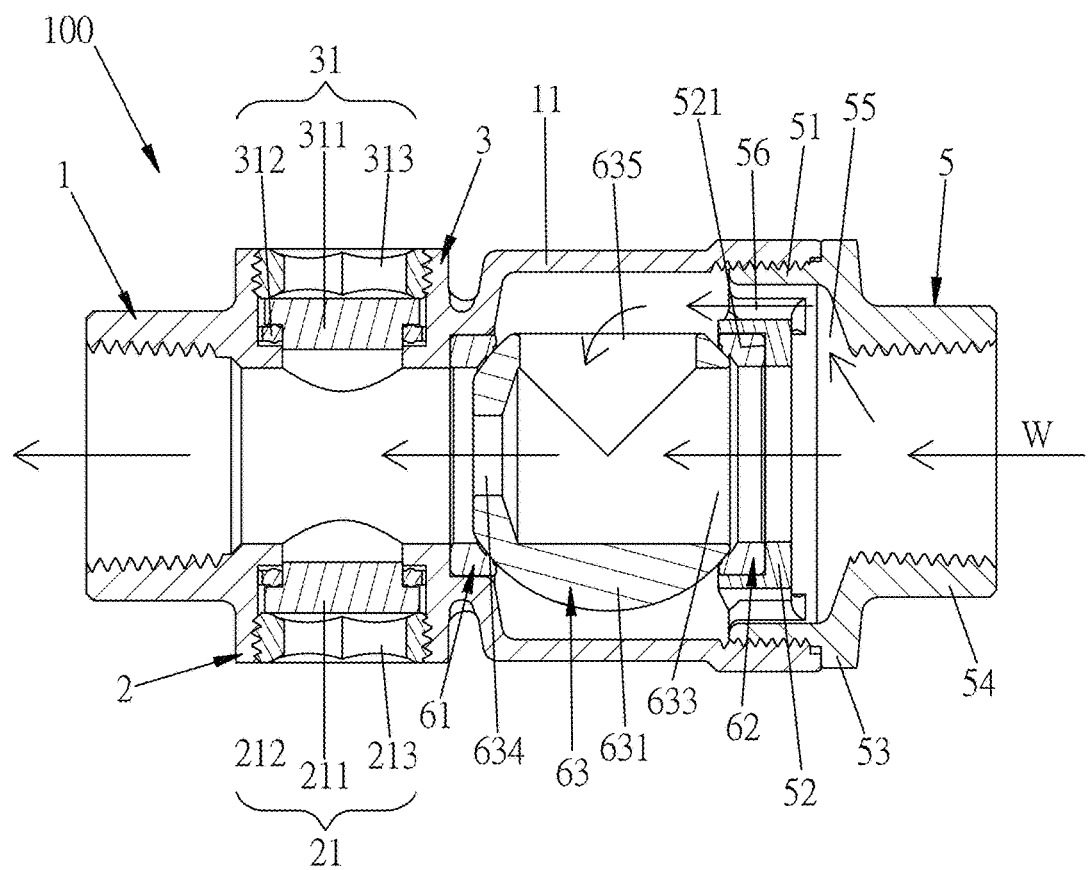
FIG. 9 is a sectional view according to the preferred embodiment of the present invention in TEST state.

Referring to FIG. 8 and FIG. 9, when the second holding hole 86 of the holding section 82 of the control handle 8 is engaged with the exposed portion of the rolling ball 42, namely, the holding section 82 of the control handle 8 is located at the mark "TEST" of the third indication member 143, the first opening 631 of the ball valve 63 faces the water inflow connector 5 and the third opening 635 of the ball valve 63 faces the small diameter pipe portion 12, enabling the fluid W from the annular guide groove 55 and the guide holes 56 of the water inflow connector 5 to pass through the third opening 635 and the first opening 633 and flow to the small diameter pipe portion 12. Meanwhile, the fluid W from the outside of the main body 631 of the ball valve 63 flows through the second opening 634 in a smaller diameter to the small diameter pipe portion 12, such that the fluid W can lower its flow and pressure to output through the second opening 634 which has a smaller diameter. Through the first visual lens assembly 21 of the first visual pipe 2 and the second visual lens assembly 31 of the second visual pipe 3, the user can observe the state of the fluid. This is in TEST state. The diameter of the second opening 634 of the ball valve 63 can be predetermined according to the required specification, enabling the fluid W flowing from the ball valve 63 to pass through the small diameter pipe portion 12 to achieve a predetermined value for outputting constant flow and constant pressure.

Figure 10:
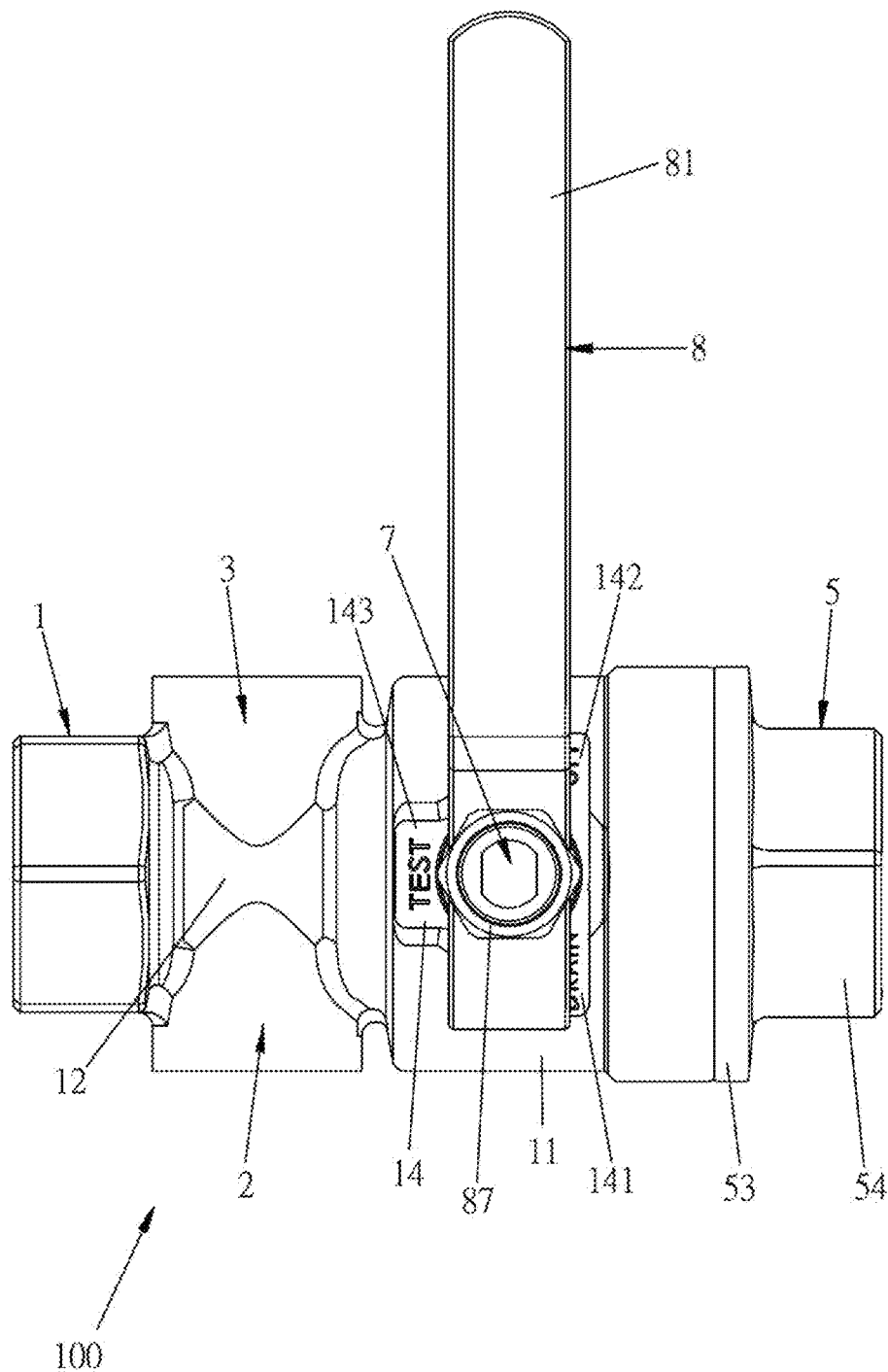
FIG. 10 is a top view according to the preferred embodiment of the present invention in DRAIN state.
Figure 11:
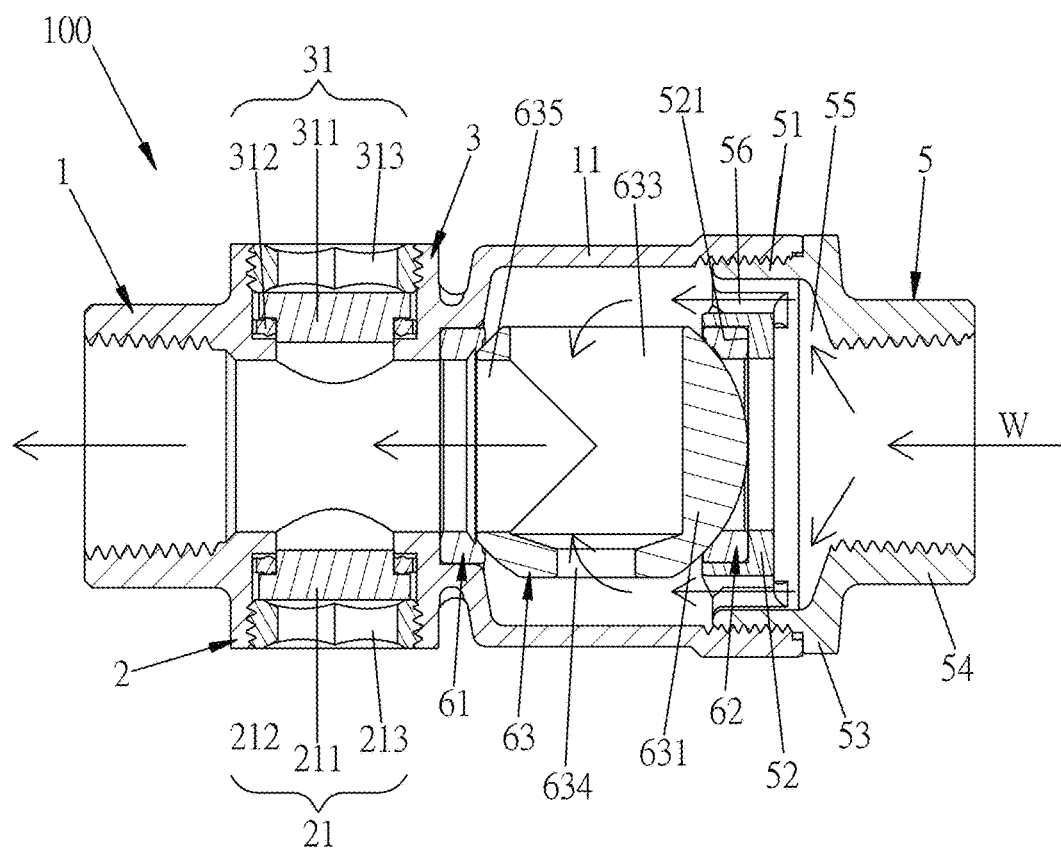
FIG. 11 is a sectional view according to the preferred embodiment of the present invention in DRAIN state.

Referring to FIG. 10 and FIG. 11, when the handle section 81 of the control handle 8 is turned in the second axial direction B, the second holding hole 86 of the holding section 82 is moved away from the exposed portion of the rolling ball 42 and the first indication notch 83 is aligned with the mark "DRAIN" of the first indication member 141. The first holding hole 85 of the handle section 81 of the control handle 8 is adapted to control the engaging section 72 of the transmission rod 7 to pivot. The drive section 71 of the transmission rod 7 is engaged with the engaging slot 632 of the ball valve 63, such that the ball valve 63 can be turned. At this time, the third opening 635 of the ball valve 63 faces the small diameter pipe portion 12, and one side of the main body 631 of the ball valve 63, opposite to the third opening 635, is to block the flow W from the annular guide groove 55 and the guide holes 56. The fluid W from the other portions, except the annular guide groove 55 and the guide holes 56, flows from the outside of the main body 631 of the ball valve 63 to the first opening 633 and the second opening 634 to be gathered to the small diameter pipe portion 12. This is in DRAIN state.

Accordingly, by the engagement of the first indication member 141 and the first indication notch 83, the engagement of the second indication member 142 and the second indication notch 84, and the engagement of the second holding hole 86 of the holding section 82 of the control handle 8 and the exposed portion of the rolling ball 42, the fluid valve structure 100 of the present invention can precisely control the turning of the ball valve 63 to be located in TEST, OFF, DRAIN state, respectively. The present invention can be operated conveniently and disassembled with ease.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A control handle assembly for a fluid valve structure comprising:
   a first indication member extending in a first radial direction, a second indication member extending in a second radial direction opposite the first radial direction, and a third indication member extending in an axial direction;
   a transmission rod and a ball valve;
   a control handle fitted and positioned on the transmission rod so as to turn the ball valve wherein the first, second and third indication members correspond to first, second, and third openings of the ball valve respectively; and
   a positioning assembly including an outer threaded pipe, a rolling ball, and a compression spring inserted in the third indication member, a first end of the compression spring being pressed against an inside of the third indication member, the rolling ball being disposed inside the third indication member to bear against an opposite second end of the compression spring, the outer threaded pipe being screwed inside the third indication member to secure the rolling ball and the compression spring inside the outer threaded pipe, one end of the outer threaded pipe, away from the third indication member, being formed with an inner flange adapted to hold against the rolling ball such that the rolling ball is retained and such that a portion of the rolling ball is exposed;
   wherein the control handle includes a handle section and a holding section extending downward from a front end of the handle section, one end of the holding section, close to the handle section, being formed with a first indication notch on a first side and a second indication notch on an opposite second side of the holding section respectively, one end of the handle section, close to the holding section, being formed with a first holding hole, the transmission rod being inserted through the first holding hole and locked by a fixing nut securing the holding section of the control handle on the transmission rod, enabling the control handle to turn the transmission rod, the holding section being formed with an open second holding hole movably engaging the exposed portion of the rolling ball such that, throughout movement of the control handle, the rolling ball only contacts the control handle when the holding section of the control handle is adjacent the third indication member.

* * * * *